US006546432B2

United States Patent
Couturier et al.

(10) Patent No.: US 6,546,432 B2
(45) Date of Patent: Apr. 8, 2003

(54) PROCESS FOR SENDING A NOTIFICATION IN A DATA PROCESSING NETWORK WITH DISTRIBUTED APPLICATIONS

(75) Inventors: Alban Couturier, Paris (FR); Michel Ruffin, Rueil Malmaison (FR); Marcel Van Der Meulen, Paris (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/070,868

(22) Filed: May 1, 1998

(65) Prior Publication Data

US 2002/0056013 A1 May 9, 2002

(30) Foreign Application Priority Data

May 2, 1997 (FR) .............................. 97 05452

(51) Int. Cl.⁷ ................................................ G06F 9/46
(52) U.S. Cl. ....................................... 709/318; 709/223
(58) Field of Search ................................. 709/300, 303, 709/200–229, 237, 238, 318, 313, 224, 223, 206, 207

(56) References Cited

U.S. PATENT DOCUMENTS

| | | | | | |
|---|---|---|---|---|---|
| 4,870,571 A | * | 9/1989 | Frink | .......................... | 364/200 |
| 5,155,842 A | * | 10/1992 | Rubin | .......................... | 714/22 |
| 5,519,780 A | * | 5/1996 | Woo et al. | ..................... | 380/49 |
| 5,604,487 A | * | 2/1997 | Frymier | .................. | 340/825.07 |
| 5,752,159 A | * | 5/1998 | Faust et al. | .................. | 455/5.1 |
| 5,854,898 A | * | 12/1998 | Riddle | .......................... | 709/231 |
| 5,984,366 A | * | 11/1999 | Priddy | .......................... | 283/72 |

FOREIGN PATENT DOCUMENTS

EP  0759591 A1  2/1997

* cited by examiner

Primary Examiner—Sue Lao
(74) Attorney, Agent, or Firm—Sughrue Mion, PLLC

(57) ABSTRACT

In a data processing network with distributed applications, a notification is sent from a sender to a receiver via a notification service with which the receiver is registered in order for the receiver to receive notifications satisfying a predetermined test criterion. The predetermined test criterion includes comparison of at least two values concerning the sender object. Applications include telecommunication networks.

16 Claims, 1 Drawing Sheet

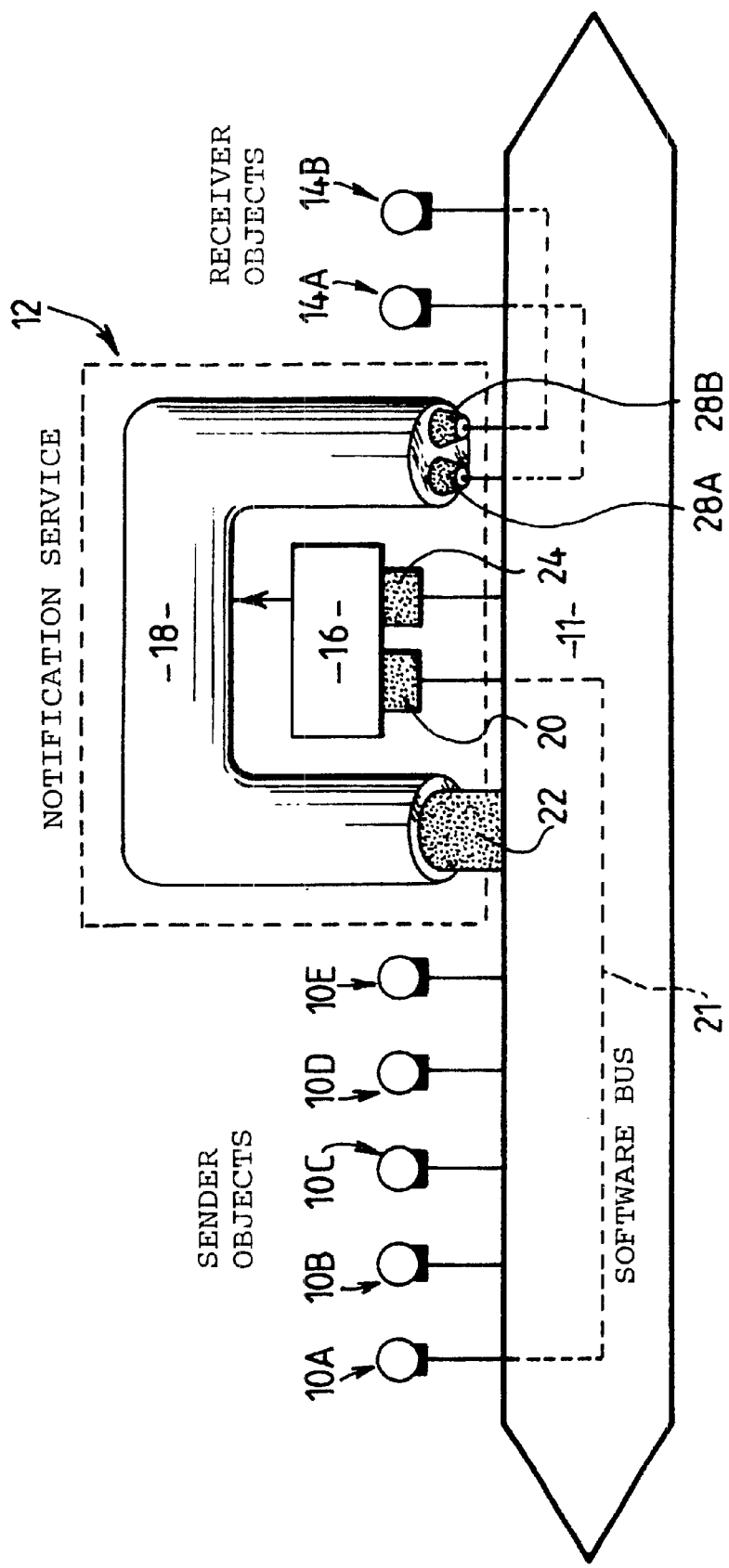

PROCESS FOR SENDING A NOTIFICATION IN A DATA PROCESSING NETWORK WITH DISTRIBUTED APPLICATIONS

BACKGROUND OF THE INVENTION

1. Field of the Invention

The present invention concerns a process for sending a notification in a data processing network with distributed applications. It also concerns a network using the aforementioned process.

The invention applies in particular to the distributed object architecture of networks conforming to the "Common Object Request Broker Architecture" (CORBA) specification of the "Object Management Group" (OMG)

2. Description of the Prior Art

In the aforementioned architecture the objects are distributed between the various data processing units in the network. They communicate via a software bus which is called the "Object Request Broker" (ORB) in the CORBA specification.

The expression "software bus" designates the entity enabling objects to send and to receive requests in a distributed environment. The distributed applications are installed on data processing units communicating with each other via the physical medium to which the data processing units forming the network are connected and via the lower layers of the communication protocol, for example the IP (Internet Protocol) and TCP (Transmission Control Protocol) layers.

The data processing units are switches of a telecommunication network, for example, or a set of workstations connected to one or more printers.

In a network of the above kind the objects, wherever they are on the network, provide services to client objects which send requests for such services over the network. The role of the software bus (ORB) is to deliver the requests to the server objects concerned and to return the output values to the client objects. This operation is transparent as far as the client object is concerned. The latter does not know where the objects reside on the network, how they are implemented, how they are stored in memory or how they are executed. In order to submit a request the client object only needs to know the reference of the object.

In accordance with the CORBA specification each distributed object has a communication interface written in IDL (Interface Definition Language). The IDL interface provides a static definition of the interfaces of the objects enabling objects to be ported between different object versions.

The result of compiling the IDL interface is tied to the implementation of the object.

Accordingly, the client object can interact with a remote server object simply by invoking the IDL functions as a local object without concerning itself with the situation of the server object on the network. To this end the client object can use the format of the communication interface of the server object to submit its request.

In networks of the above kind large quantities of data are transmitted directly and synchronously from a sender object to a receiver object connected to the same software bus.

Large quantities of data pass through notification servers. The latter receive notifications from sender objects registered as such with the notification service. Receiver objects are registered as receiver objects and have indicated one or more predetermined test criteria for filtering notifications sent to them. The filtering is based on the data received from the notification service notifications that satisfy the predetermined test criteria.

The filtering methods are particularly useful for reducing the quantity of data transmitted over the network and for adapting the notification service to suit the needs of each receiver object.

The filters can be declared dynamically and modified.

The data transmitted by the sender objects in the form of notifications is structured into fields or attributes containing values specific to each sender object and concerning the latter.

Filtering consists in identifying certain fields in the data structure and carrying out a comparison based on the values of these fields and in accordance with the description of the filter.

Only the notifications for which the extracted values satisfy the predetermined test criteria are transmitted to the receiver object.

In such networks the filtering methods employed use simple structure tests that are not capable of effective filtering. In particular, these filters do not assure efficient filtering and do not use sufficiently sophisticated test criteria. Also, they are not able to limit effectively the traffic to the receiver objects so that the latter receive only the data they need.

Given the above, the network carries a large quantity of data of little relevance, unnecessarily increasing the traffic on the network.

An aim of the invention is to solve this problem and in particular to propose a transmission process and a network using the process in which efficient filtering effectively reduces the volume of communications whilst enabling network operation imperatives to be satisfied.

SUMMARY OF THE INVENTION

To this end, the invention consists in a process for sending a notification in a data processing network with distributed applications from a sender to at least one receiver via a notification service with which the receiver or each receiver is registered in order to receive notifications satisfying a predetermined test criterion, wherein:

the sender sends to the notification service a notification including a set of at least two values concerning the sender;

for each registered receiver, the notification service checks if the set of values satisfies the predetermined test criterion associated with the receiver;

the notification service sends the notification concerning the sender to the receiver if the predetermined test criterion is satisfied; and the predetermined test criterion includes comparison of the at least two values concerning the sender.

Particular embodiments of the process can have one or more of the following features:

the network includes a plurality of senders, each sender sends to the other senders at least one particular value representative of information concerning it, the set in values of the notification sent by the sender to the notification service includes a value which depends on at least one of the particular values received by the sender, and the comparison is effected between the value which is dependent on at least one of the particular values and a value concerning the sender;

the sender or each sender is adapted to monitor the operation of a resource and the values compared constitute information representative of the functional status of the resource; and the predetermined test criterion is defined by the receiver when it is registered with the notification service.

The invention further consists in a data processing network with distributed applications including at least one sender, at least one receiver and a notification service with which the receiver or each receiver is registered in order to receive notifications satisfying a predetermined test criterion, wherein:

the sender or each sender includes means for sending to the notification service a notification including a set of at least two values concerning the sender;

the notification service includes means for verifying, for each registered receiver, if the set of values satisfies the predetermined test criterion associated with the receiver;

the notification service includes means for sending the notification concerning the sender to the receiver if the predetermined test criterion is satisfied; and the predetermined test criterion includes comparison of at least two values concerning the sender.

Particular embodiments of the network can have one or more of the following features:

it includes a plurality of senders, each sender includes means for sending to the other senders at least one particular value representative of information concerning it, the set of values of the notification sent by the sender to the notification service includes a value dependent on at least one of the particular values received by the sender, and the predetermined test criterion includes comparison of the value dependent on at least one of the particular values and a value concerning the sender;

the sender or each sender is adapted to monitor the operation of a resource and the values compared constitute information representative of the functional status of the resource;

the receiver includes means for defining the predetermined test criterion when it is registered with the notification service; and at least one of the senders and receivers is an object.

The invention further consists in a communication unit of a data processing network with distributed applications, which network includes at least one sender and at least one receiver, the communication unit including a notification service with which the receiver or each receiver is registered in order to receive notifications satisfying a predetermined test criterion, the sender or each sender including means for sending to the notification service a notification including a set of at least two values concerning the sender, the notification service including means for verifying, for each registered receiver, if the set of values satisfies the predetermined test criterion associated with the receiver and means for sending the notification concerning the sender to the receiver if the predetermined test criterion is satisfied, wherein the predetermined test criterion includes comparison of at least two values concerning the sender.

The invention will be better understood after reading the following description given by way of example only and with reference to the appended drawing.

BRIEF DESCRIPTION OF THE DRAWING

The single FIGURE in the appended drawing is a diagrammatic representation of a network of distributed objects in accordance with the invention using a notification service.

DETAILED DESCRIPTION OF THE PREFERRED EMBODIMENT

The following description assumes that each object conforms to the CORBA specification and consequently that objects can communicate with each other simply by submitting requests independently of their situation on the network.

The FIGURE shows five sender objects 10A, 10B, 10C, 10D and 10E. Each of these objects monitors the operation of a separate data processing unit, for example a switch in a telecommunication network. The objects are adapted to assess the functional status of any type of component of the network, whether a software resource or a hardware resource. The objects are distributed across the network and are connected by a software bus 11.

A notification service 12 is connected to the software bus and assures asynchronous communication of data between the network objects.

Receiver objects 14A, 14B are connected to the software bus 11. These objects are assigned to telecommunication network operation monitoring services, for example, and are in particular adapted to detect faults on the network and to advise an operator of them so that action can be taken with regard to them.

The notification service 12 is formed of a set of objects connected to the software bus 11. In particular, it includes a notification server administrator 16 and a notification channel 18 adapted to send notifications received from one of the sender objects to one or more of the receiver objects if the notification data received satisfies a predetermined test criterion formulated by the receiver object when it subscribes to the notification service.

Each sender object 10A through 10E is registered with the notification server administrator 16 via an IDL registration interface 20. Registration is effected by sending a request from the sender object to the interface 20. A request of this kind for the object 10A is symbolized by the arrow 21. Each sender object 10A through 10E, when it is registered, receives the reference and possibly the format of the IDL communication interface 22 of the notification channel 18. The reference enables it to transmit to the notification service 12 notifications including values concerning it. The notifications constitute alarms and are representative of the functional status of the data processing unit with which the sender object is associated.

The structure of an alarm written in IDL is in the following form, for example:

```
struc {
string name;
short severity;
short highestseverity;
string alarm_reason;
};
``` where:

"name" is the name of the sender object,

"severity" is the severity level on a scale of 1 to 5 of the fault encountered on the data processing unit associated with the corresponding sender object, "highestseverity" is the highest severity level encountered in the set of sender objects 10A through 10E, and "alarm_reason" is a fault identifier.

The sender object assigns a value to each field according to the functional status of the associated unit.

In order to assign a value to the "highestseverity" field, the objects 10A through 10E are adapted to communicate with each other so that if one of the objects sends an alarm reflecting a fault of a particular level in the associated data processing unit all the other objects receive that alarm via their IDL interface.

Moreover, the receiver objects 14A, 14B are registered with the notification service 12 in order to receive notifications concerning them. To this end each receiver object 14A, 14B is registered with a registration IDL interface 24 of the notification server administrator 16. This interface is adapted to register objects connected to the software bus so that the latter receive notifications from the notification service with which they are registered.

Registration is effected in particular by giving the reference of the registered receiver object to the notification server administrator 16.

The notification channel 18, forming a CORBA object, is controlled by the notification server administrator 16. In particular, the notification server administrator 16 registers receiver objects with the notification channel 18 by giving the latter their reference.

When it is registered with the notification service, each receiver also defines a filter for selecting notifications to be sent to it subject to validation of a predetermined test criterion contained in the filter.

According to the filter defined by each receiver object, the notification server administrator 16 commands the configuration of the notification channel 18 to use filters 28A, 28B respectively specific to the receiver objects 14A and 14B. Accordingly the notification channel 18 knows, for each receiver object 14A, 14B, the reference of the object and the test criterion specific to that object.

In accordance with the invention, the predetermined test criterion consists in comparing two values originating from the same sender object and representative of information concerning it.

For example, filtering is effected by comparing levels of the "severity" and "highestseverity" fields so that, of all alarms present on the network, only alarms having the highest level are transmitted to the receiver objects that have imposed such filtering.

To this end the structure of the filter written in IDL in accordance with the CORBA specification is of the following form:

```
typedef string AttributeId;
struct AttributeValueType {
    AttributeId attributeId;
    any attributeValue;
    };
struct TwoAttributesType {
    AttributeId attributeId1;
    AttributeId attributeId2;
    };
enum TestType {AttributeWithValue, AttributeWithOtherAttribute};
union AttributeType switch (TestType)
    {
        case AttributeWithValue      :AttributeValueType single;
        case AttributeWithOther      :TwoAttributesType multi;
            Attribute
    };
enum FilterItemType {
    equalityChoice,
    greaterOrEqualChoice,
    lessOrEqualChoice,
    };
union FilterItemSwitch (FilterItemType) {
```

-continued

```
    case equalityChoice          :AttributeType equality;
    case greaterOrEqualChoice    :AttributeType greaterOrEqual;
    case lessOrEqualChoice       :AttributeType lessOrEqual;
};
``` where:

"AttributeId" is the identifier of an attribute.

"FilterItem" is a basic test which, associated with other basic tests using logic operators such as AND, OR, NOT, is used to write complex tests.

"FilterItem" is determined by "FilterItemType" which gives the type of test, in the present case, from the following tests: equality, greaterOrEqual, lessOrEqual.

The arguments for the test are stored in "AttributeType".

In accordance with the invention there are two different structures for the test arguments. These are "AttributeValueType", which corresponds to the test effected by comparing a value of a field of the data structure and a predetermined reference value, and "TwoAttributesType", which corresponds to the test effected by comparing two values of fields of the same data structure relating to the same sender object.

For writing the filter these two structures are designated more explicitly, respectively by:

"AttributeWithValue", and

"AttributeWithOtherAttribute".

With a filter structure of the above kind, the filtering of the notifications using a test criterion according to whether the severity level ("severity") of the fault in the data processing unit is greater than or equal to the highest level ("highestseverity") on the network, is written in the form:

greaterOrEqual(AttributeType(AttributeWithOtherAttribute) {severity, highestseverity})

A filter system of the above kind enhances the facility to select notifications to be sent to the receiver objects. In particular, the filter criteria can evolve with time and the status of the network.

With current filters using only comparison of an attribute value and a reference value the filter criteria cannot evolve in this way.

Although the above description refers to sender and receiver objects, the latter can be conventional software components and in particular conventional procedural programs.

There is claimed:

1. A process for sending a notification, in a data processing network having distributed applications, from a sender to at least one receiver via a notification service, with which said receiver is registered in order to receive notifications satisfying a predetermined test criterion, wherein:

said sender sends to said notification service a notification including a set of at least two values concerning said sender, wherein a first value represents a notification being sent by said sender and a second value represents a reference level against which said first value is compared;

for each registered receiver, said notification service checks if said set of values satisfies said predetermined test criterion associated with said receiver;

said notification service sends said notification concerning said sender to said receiver if said predetermined test criterion is satisfied; and said predetermined test criterion includes comparison of said at least two values concerning said sender to one another.

2. The process claimed in claim 1 wherein said network includes a plurality of senders, each sender sending to the other senders at least one particular value representative of information concerning said sender, said set of values in said notification sent by said sender to said notification service including a value which depends on at least one of said particular values received by said sender, and wherein said comparison is effected between said value which is dependent on at least one of said particular received values, and a value concerning said sender.

3. The process claimed in claim 1 wherein said sender is adapted to monitor the operation of a resource, and the values compared constitute information representative of the functional status of said resource.

4. The process claimed in claim 1 wherein said predetermined test criterion is defined by said receiver when it is registered with said notification service.

5. A data processing network having distributed applications, said network including at least one sender, at least one receiver, and a notification service with which said receiver is registered in order for said receiver to receive notifications satisfying a predetermined test criterion associated with the receiver, wherein:

said sender includes means for sending to said notification service a notification including a set of at least two values concerning said sender, wherein a first value represents a notification being sent by said sender and a second value represents a reference level against which said first value is compared;

said notification service includes means for verifying, for each registered receiver, if said set of values satisfies said predetermined test criterion;

said notification service includes means for sending said notification concerning said sender to said receiver if said predetermined test criterion is satisfied; and said predetermined test criterion includes comparison of said at least two values concerning said sender to one another.

6. The network claimed in claim 5 including a plurality of senders, wherein each sender includes means for sending to the other senders at least one particular value representative of information concerning said sender, said set of values in said notification sent by said sender to said notification service including a value dependent on at least one of said particular values received by said sender, and wherein said predetermined test criterion includes comparison of said value dependent on at least one of said received values and a value of said particular values concerning said sender.

7. The network claimed in claim 5 wherein said sender is adapted to monitor the operation of a resource, and wherein the values compared constitute information representative of the functional status of said resource.

8. The network claimed in claim 5 wherein said receiver includes means for defining said predetermined test criterion when said receiver is registered with said notification service.

9. The network claimed in claim 5 wherein at least one of said senders and said receivers is an object.

10. A communication unit of data processing network with distributed applications, which network includes at least one sender and at least one receiver, said communication unit including a notification service with which said receiver is registered in order to receive notifications satisfying a predetermined test criterion, said sender including means for sending to said notification service a notification including a set of at least two values concerning said sender, wherein a first value represents a notification being sent by said sender and a second value represents a reference level against which said first value is compared, said notification service including means for verifying, for each registered receiver, if said set of values satisfies said predetermined test criterion associated with said receiver, said notification service also including means for sending said notification concerning said sender to said receiver if said predetermined test criterion is satisfied, wherein said predetermined test criterion includes comparison of said at least two values concerning said sender to one another.

11. The process claimed in claim 1, wherein said second value represents a reference level that is dependent at least in part on notifications sent from other senders.

12. The process claimed in claim 11, wherein said second value is the highest alarm sent by said other senders.

13. The network claimed in claim 5, wherein said second value represents a reference level that is dependent at least in part on notifications sent from other senders.

14. The network claimed in claim 13, wherein said second value is the highest alarm sent by said other senders.

15. The communication unit claimed in claim 10, wherein said second value represents a reference level that is dependent at least in part on notifications sent from other senders.

16. The communication unit claimed in claim 15, wherein said second value is the highest alarm sent by said other senders.

* * * * *